(12) United States Patent
Riman et al.

(10) Patent No.: US 7,704,321 B2
(45) Date of Patent: Apr. 27, 2010

(54) POLYCRYSTALLINE MATERIAL HAVING A PLURALITY OF SINGLE CRYSTAL PARTICLES

(75) Inventors: Richard Riman, Belle Mead, NJ (US); Larry McCandlish, Highland Park, NJ (US); Xiangyuan Liu, Highland Park, NJ (US)

(73) Assignee: Rutgers, the State University, New Brunswick, NJ (US)

( * ) Notice: Subject to any disclaimer, the term of this patent is extended or adjusted under 35 U.S.C. 154(b) by 1261 days.

(21) Appl. No.: 11/062,273

(22) Filed: Feb. 18, 2005

(65) Prior Publication Data

US 2005/0188916 A1    Sep. 1, 2005

Related U.S. Application Data

(63) Continuation-in-part of application No. 10/145,372, filed on May 13, 2002, now Pat. No. 7,022,303.

(51) Int. Cl.
*C30B 7/14*    (2006.01)
(52) U.S. Cl. .............................. 117/68; 117/69; 117/70
(58) Field of Classification Search ................... 117/68, 117/69, 70
See application file for complete search history.

(56) References Cited

U.S. PATENT DOCUMENTS

| | | | |
|---|---|---|---|
| 3,967,355 A | 7/1976 | Giamei et al. | 29/194 |
| 4,475,980 A | 10/1984 | Rhemer et al. | 156/603 |
| 4,801,476 A | 1/1989 | Dunsmuir et al. | |
| 4,961,818 A | 10/1990 | Benn | 156/603 |
| 5,441,803 A | 8/1995 | Meissner | 428/220 |
| 6,023,312 A * | 2/2000 | Hasegawa et al. | 349/88 |
| 6,158,952 A | 12/2000 | Roberts | |
| 6,180,226 B1 | 1/2001 | McArdle et al. | 428/332 |
| 2006/0286345 A1* | 12/2006 | Nakao | 428/131 |

FOREIGN PATENT DOCUMENTS

| | | |
|---|---|---|
| EP | 0190854 A2 | 8/1986 |
| EP | 0678598 A1 | 10/1995 |
| JP | 2003-095793 * | 3/2003 |

OTHER PUBLICATIONS

Morawetz, et al., "Zeolite Films Prepared via the Langmuir-Blodgett Technique," Colloids and Surfaces, A: Physiochemical and Engineering Aspects, 198-200, 409-414 (Feb. 18, 2002).

* cited by examiner

*Primary Examiner*—Robert M Kunemund
(74) *Attorney, Agent, or Firm*—Fox Rothschild LLP

(57) ABSTRACT

Polycrystalline materials of macroscopic size exhibiting Single-Crystal-Like properties are formed from a plurality of Single-Crystal Particles, having Self-Aligning morphologies and optionally bonded together and aligned along at least one, and up to three, crystallographic directions.

20 Claims, 2 Drawing Sheets

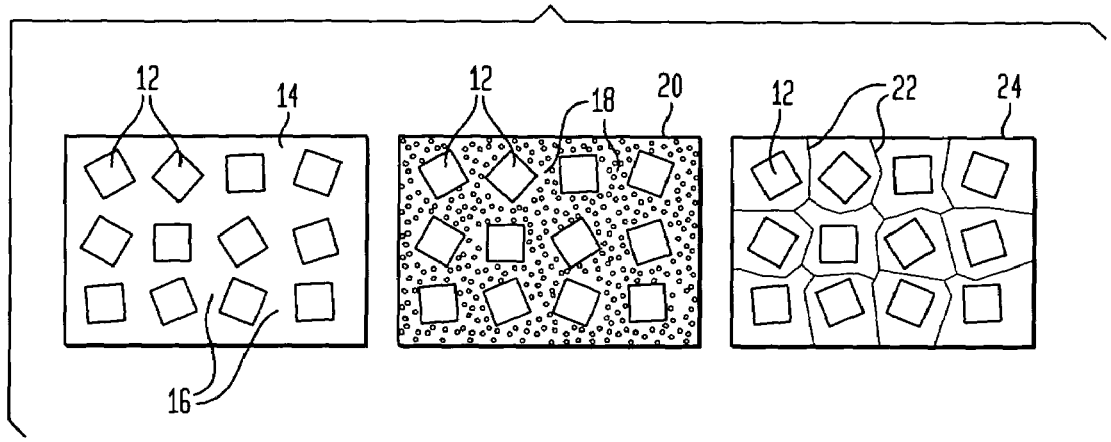
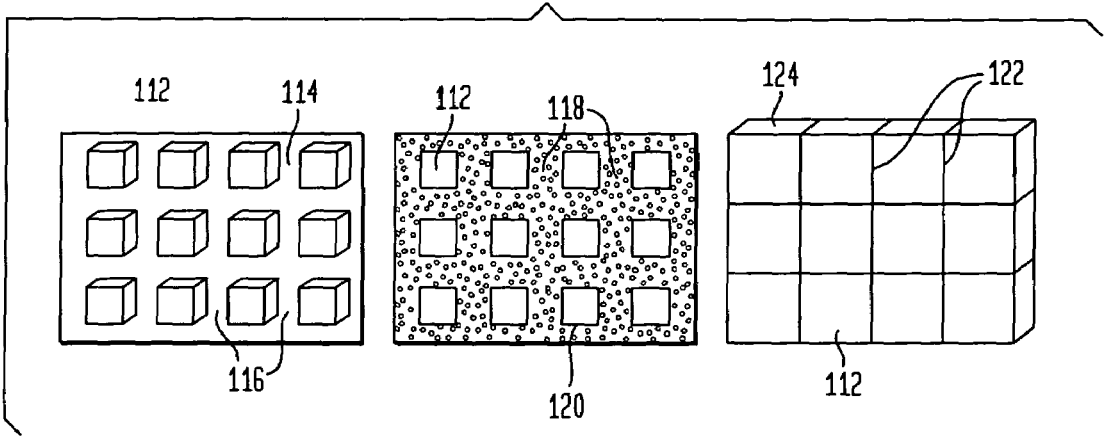

POLYCRYSTALLINE MATERIAL HAVING A PLURALITY OF SINGLE CRYSTAL PARTICLES

CROSS REFERENCE TO RELATED APPLICATIONS

The present application is a Continuation-In-Part of U.S. patent application Ser. No. 10/145,372 filed May 13, 2002 now U.S. Pat. No. 7,022,303. The present application also claims priority benefit under 35 U.S.C. § 120 of International Application No. PCT/US 03/015226 designating the United States and having a May 14, 2003 International filing date. The disclosures of both applications are incorporated herein by reference.

BACKGROUND OF THE INVENTION

The present invention relates to polycrystalline materials having Single-Crystal-Like properties, in which a plurality of Single-Crystal Particles are assembled together with their crystallographic axes aligned in at least one, but also possibly in two or three dimensions. The present invention also relates to methods for forming the polycrystalline materials of the present.

Single crystal materials have applications in mechanical, electronic, electromechanical, optical and magnetic devices. However, the growth and processing of large single crystals is difficult, time-consuming and expensive. The growth of ceramic single crystals from high temperature melt or liquid solution often require expensive and energy consuming furnaces. The required melt or liquid solution is contained by crucibles often consisting of expensive precious metals such as Pt or Pd. Single crystals must be cooled from their growth temperatures, and can be damaged upon cooling by stresses induced by a variety of factors such as polymorphic phase transformation or anisotropic contraction of the lattice. Stresses can induce cracks or significant changes in crystal properties. These induced stresses can make it difficult, if not impossible, to manufacture useful crystals in large sizes. Other problems associated with high temperature crystal growth arise from phenomena that alter the composition of the crystal such as volatility of one or more of the components and incongruent melting behavior. In addition, molten solvents can introduce impurities into the crystal that cannot be eliminated by conventional purification processes.

Single crystals are typically grown as large boules. These boules are processed by cutting, dicing and polishing prior to incorporation into a device. These steps are time-consuming and may introduce defects. The size of the finished crystal is limited by the processing operation. A lower limit in size of hundreds of microns is typical. The upper size limit is governed by the size and quality of the crystal boule. The size varies greatly with composition. For example, Si can be grown up to a diameter of about 10 inches, while the diameter of YIG may be only on the order of 0.5 inch.

Furthermore, single crystals have lower fracture toughness than their polycrystalline counterparts. Thus, single crystals can be extremely brittle, and their strength can be greatly diminished with surface damage (e.g., scratches) and this diminishes their reliability for many types of applications.

There exists a need for low cost materials with performance properties comparable to single crystals yet which overcome the limitations of single crystals described above and low cost methods for their preparation.

SUMMARY OF THE INVENTION

This need is met by the present invention. A cost-effective method of fabricating polycrystalline single phase and composite materials has been developed that addresses the deficiencies of single crystals while capturing some, if not all of the performance advantages. The present invention takes Single-Crystal Particles and packs and aligns them with respect to one, two or three dimensions to form a polycrystalline microstructure that for all practical purposes captures the performance of at least one important property of a large single crystal.

Therefore, according to one aspect of the present invention, a polycrystalline material is provided in which a plurality of Single-Crystal Particles having self-orientation are bonded together to fix their orientation along at least one crystallographic direction. The particles interact with one another or with a substrate surface to align their crystallographic axes in one, two or three dimensions. The preferred degree of alignment will depend on the device application for the material. For purposes of alignment, it is essential that the particles have uniform shapes with dominant planar surfaces in a suitable orientation, preferably perpendicular to or parallel to, with respect to the desired direction of alignment.

According to one embodiment of this aspect of the invention, the polycrystalline materials comprise a plurality of Single-Crystal seed Particles aligned in at least one direction, in which the voids there between have been filled with a nutrient matrix of nanoparticles of the same or different material and heated at a temperature sufficient to induce solid state diffusion until the nanoparticles bond together adjacent Single-Crystal Particles. Preferably, this embodiment is heated at a temperature sufficient to induce grain boundary mobility, so that the Single-Crystal Particles grow by consumption of the nanoparticles until impingement of adjacent crystal grain boundaries prevent further growth. The net result is a polycrystalline microstructure, the grains of which for all practical purposes are aligned in one, two or three dimensions so that it performs like a single crystal with respect to some desired property.

According to one preferred embodiment of this aspect of the invention, cube-shaped Single-Crystal Particles are packed and aligned with respect to one, two or three dimensions to form a polycrystalline microstructure that for all practical purposes captures the performance of at least one important property of a large single crystal. According to this preferred embodiment of this aspect of the invention, the cube-shaped Single-Crystal Particles are bonded together by filling the voids with nanoparticles, after which the filled array is heated to at least a temperature sufficient to induce solid state diffusion between the nanoparticles and the crystal particles until the nanoparticles bond together adjacent Single-Crystal Particles. According to an even more preferred embodiment, the temperature of the heating step is sufficient to induce grain boundary mobility, so that the cube-shaped Single-Crystal Particles grow by consumption of the nanoparticles until impingement of the grain boundaries of adjacent single crystal regions occurs.

According to another preferred embodiment of the present invention, the polycrystalline materials comprise a plurality of Single-Crystal Particles that are aligned in at least one crystallographic direction and bonded together by a polymer phase. This embodiment of the present invention incorporates the discovery that aligned Single-Crystal Particles produce a net Single-Crystal-Like behavior, even when the particles are bonded together by a non-ceramic material without impingement of the Single-Crystal Particle surfaces. Accordingly, essentially any thermoplastic or thermosetting polymer is suitable for use with this embodiment of the present invention.

For example, applying an oscillating electric field across a polymer-ceramic composite consisting of an aligned array of piezoelectric Single-Crystal Particles causes each individual crystalline particle to generate an acoustic wave, which combines with waves from other particles to form a net acoustic wave characteristic of a single crystal having the same size as the array. It is the particle alignment that produces the net Single-Crystal-Like behavior. This embodiment of the invention thus provides a polymer-bonded Single-Crystal-Particle composite material with Single-Crystal-Like properties, which does not require the high temperature steps necessary for making a ceramic single crystal.

The present invention also includes methods by which the polycrystalline materials of the present invention are made. In particular, a film-forming process has been developed for making large-area single-crystal-like films from Single-Crystal Particles.

In this process a microarray of Single-Crystal Particles is self-assembled at the interface of two immiscible fluids. The first fluid is a supporting fluid, such as water, upon which the microarray assembles. The second fluid is a particle dispersion containing three components that provide the means for self-assembly. The three components are (1) the Single-Crystal Particles, (2) a dispersant liquid that aids in the dispersion of the particles in the second fluid and also provides a spreading tension that causes a film of the second fluid to spread on the surface of the first fluid; and (3) a liquid that provides a capillary force that acts on the powder particles to form an aligned-particle microarray.

The inventive method, however, is not limited to the formation of oriented Single-Crystal Particle microarrays, but finds utility in the preparation of powder particle monolayer films in general. Therefore, according to another aspect of the present invention, a method of forming a monlayer of particles is provided including the steps of: (A) contacting a particle dispersion with the surface of an immiscible supporting fluid, wherein the particle dispersion has a lower density (specific gravity) than the supporting fluid and is a dispersion of particles capable of floating without wetting on the supporting fluid in a mixture of (1) a dispersant liquid that aids in the dispersion of the particles in the dispersion and provides a spreading tension that causes a film of the fluid dispersion to spread on the surface of the supporting fluid, and (2) a capillary fluid that acts on the particles to form a monolayer particle film; and (B) removing the dispersant liquid so that a particle monolayer assembles at the interface of the supporting liquid and the particle dispersion. The particles can have a higher density than the supporting fluid or the dispersant liquids.

Preferred methods according to the present invention employ Single-Crystal Particles, which assemble a microarrays oriented in at least the <001> direction. Particles less than about 1000 microns in size are preferred, with particles less than about 100 microns in size being more preferred, and nanosized particles less than one micron in size being most preferred.

The contacting is preferably performed by incremental addition of the particle dispersion to the supporting fluid. The dispersant liquid is preferably removed by evaporation, and is also preferably a volatile liquid. At the end of the addition step, a particle monolayer film remains suspended at the interface of the supporting fluid and the particle dispersion. The film is flexible and conformable and can be removed from the interface and deposited intact onto any solid substrate surface. The capillary forces that form the monolayer also hold the monolayer together as it is transferred from the surface of the supporting fluid to the substrate surface. Therefore, methods according to one embodiment of this aspect of the present invention will further include the step of transferring the particle monolayer to the surface of a solid substrate. Preferred methods bond the particle film to the substrate surface.

The present invention also includes particle monolayers prepared by the method of the present invention. The particle film may be formed into the single phase and composite materials of the present invention. According to one embodiment of this aspect of the invention, the particles are Single-Crystal seed Particles and the voids therebetween are filled with a nutrient matrix of nanoparticles of the same or different material and heated at a temperature sufficient to induce solid state diffusion until the nanoparticles bond together adjacent Single-Crystal Particles. Preferably, this embodiment is heated at a temperature sufficient to induce grain boundary mobility, so that the Single-Crystal Particles grow by consumption of the nanoparticles until impingement of adjacent crystal grain boundaries prevent further growth.

According to one preferred embodiment of this aspect of the invention, cube-shaped Single-Crystal Particles are used. The cube-shaped Single-Crystal Particles are bonded together by filling the voids with a nutrient matrix of nanoparticles, after which the filled array is heated to at least a temperature sufficient to induce solid state diffusion between the nanoparticles and the crystal particles until the nanoparticles bond together adjacent Single-Crystal Particles. According to an even more preferred embodiment, the temperature of the heating step is sufficient to induce grain boundary mobility, so that the cube-shaped Single-Crystal Particles grow by consumption of the nanoparticles until impingement of the grain boundaries of adjacent single crystal regions occurs.

According to another preferred embodiment of the present invention, polycrystalline materials are prepared in which the particles are Single-Crystal Particles forming a microarray film in which the Particles are aligned in at least the <001> direction and bonded together by a polymer phase. This embodiment of the invention thus provides a method by which polymer-bonded Single-Crystal-Particle composite materials with Single-Crystal-Like properties, can be made, which does not require the high temperature steps necessary for making a ceramic single crystal.

The polycrystalline Single-Crystal-Like composite materials of the present invention, are suitable for many applications where a single crystal would be useful. Accordingly, the present invention also includes mechanical, electronic, electromechanical, optical and magnetic devices incorporating the Single-Crystal-Like polycrystalline materials of the present invention. The polycrystalline materials of the present invention are particularly useful in the preparation of piezoelectric devices, which are included among the electromechanical devices of the present invention.

It is conceivable that the present invention could be utilized for the purposes of making a structural material, where the mechanical properties alone sufficiently justify its utility. Thus, in one preferred embodiment of this invention, a highly filled polymer-ceramic composite consists of aligned ceramic cubes in a low volume fraction matrix of organic polymer. In another preferred embodiment, a high volume fraction of ceramic single crystal cube-shaped particles are dispersed in a low volume fraction of non-aligned fine grains of the same ceramic composition. This invention takes advantage of the higher fracture toughness that polycrystalline textured materials have in comparison to their single crystal counterparts. Accordingly, the polycrystalline Single-Crystal-Like materials of the present invention are much more mechanically durable than comparable single crystals of the prior art. Thus, the present invention also provides materials having the functional electrical and optical properties of single crystals but which can also endure mechanical shock, vibration, and the like. Further features and advantages of the invention will become more readily apparent from the following detailed description when taken in conjunction with the accompanying drawings.

BRIEF DESCRIPTION OF THE DRAWINGS

FIG. 1 depicts the preparation of a polycrystalline composite material according to one embodiment of the present invention in which the individual cube-shaped Single-Crystal Particles are aligned in one crystallographic direction;

FIG. 2 depicts the preparation of a polycrystalline composite material according to another embodiment of the present invention, wherein the individual cube-shaped Single-Crystal Particles are aligned in three crystallographic directions.

DETAILED DESCRIPTION OF THE PREFERRED EMBODIMENTS

Figure 3:
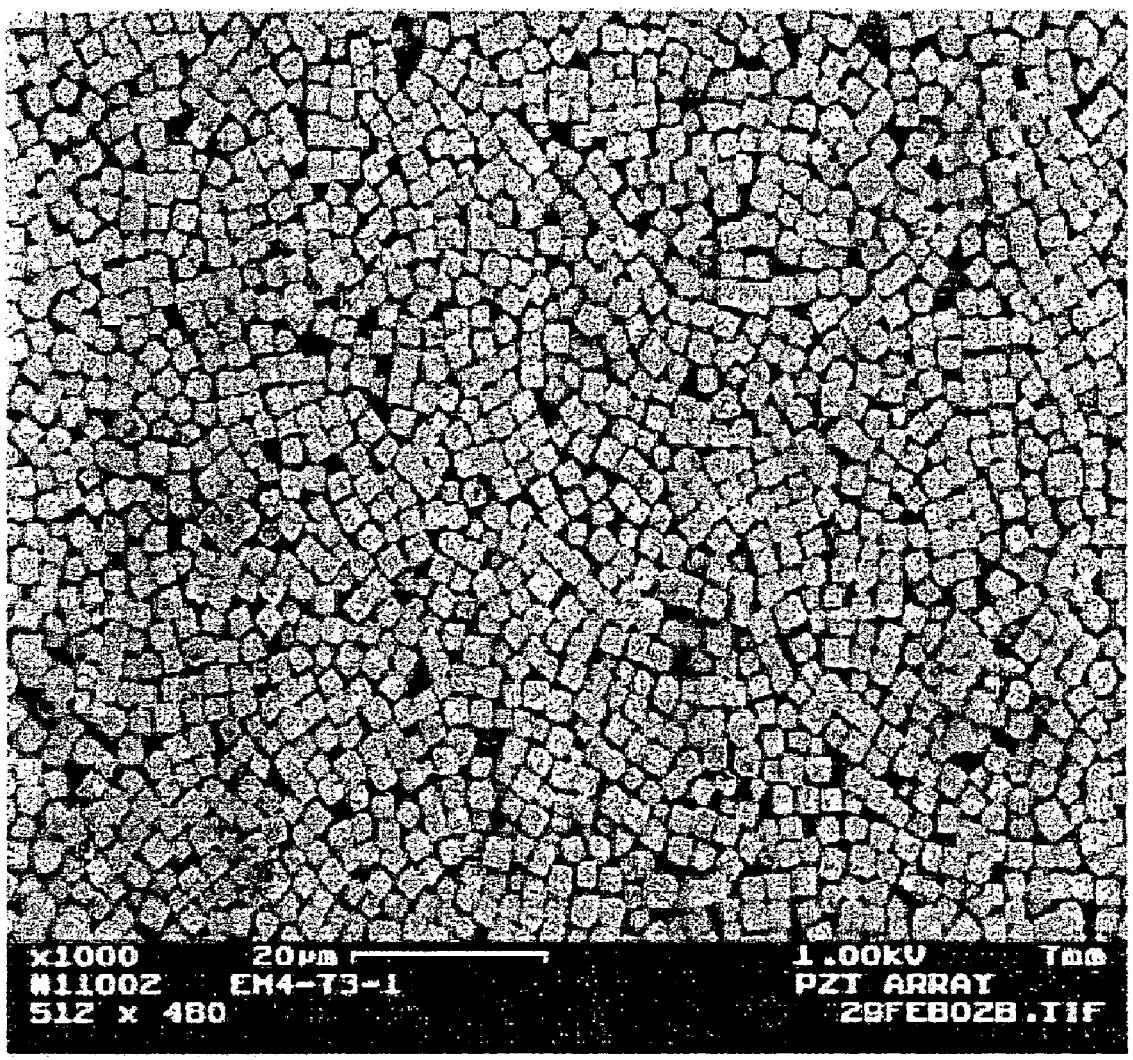
FIG. 3 depicts a PZT cube microarray with lateral particle faces in contact assembled according to the method of the present invention.

For the purposes of the present invention, "Single-Crystal Particles" are defined as single crystals with controlled size on a size scale of fractions of a millimeter or less and controlled morphology where all the particles have essentially the same shape or habit. Furthermore, for purposes of the present invention, the term "Single-Crystal Particle" also includes polycrystalline agglomerates having low-angle grain boundaries between the individual single-crystal grains of the agglomerate, such that the polycrystalline agglomerate exhibits essentially single crystal behavior. Perfect Single-Crystal Particles are nevertheless preferred. By controlled morphology, we mean that the Single-Crystal Particles have a single large (dominant) crystal face in a suitable orientation, preferably perpendicular to or parallel to, with respect to the desired direction of alignment. More than one large crystal face is acceptable, provided that these faces are symmetrically equivalent. In certain circumstances, more than one crystallographic direction would be acceptable, thus, in this case, a mixture of crystals having the desired dominant crystal faces would be acceptable. In the case, where there is no dominant crystal face, such as in a cylindrical single crystal fiber, then the required dominant direction is along the length of the fiber and this must also be the desired direction of alignment.

Single crystals are defined as macroscopic crystals that are inches, centimeters, or many millimeters in size. "Single-Crystal-Like" materials are aligned arrays of Single-Crystal Particles whose positions and orientation are fixed by bonding to a substrate and/or embedding in a polymer, metallic or ceramic matrix. A reactive embedding matrix can consist of nutrient that allows the Single-Crystal Particles to be grown to a larger size. Alternatively, the embedding matrix can be inert and only bond the Single-Crystal Particles together. All of the above mentioned Single-Crystal-Like materials can also be referred to as textured materials. The embedding matrix can play a functional (e.g., optical, electrical, magnetic) and/or structural role in influencing the materials properties.

The Single-Crystal Particles of the present invention have at least "Self-Aligning" morphologies, which may also be highly "Space Filling." For purposes of the present invention, "Self-Aligning" morphologies are defined as including any particles that are capable of self-organizing to form a polycrystalline structure wherein the Single-Crystal Particles are aligned along at least one crystallographic direction so that the particles perform collectively like a monolithic single crystal. If the particle morphology permits the packing of particles at higher volume fractions than normally encountered for randomly oriented and packed equiaxed particles, then these morphologies are also "Space Filling". Volume fractions typically encountered for equiaxed randomly oriented and packed particles correspond to a value of about 0.65 or less. The present invention in a particular embodiment, where cube-shaped particles are aligned and packed can produce packing fractions that approach 1.0 when 3-dimensional alignment is achieved. There are numerous systems with Single-Crystal Particle morphologies that offer both Self-Aligning and Space-Filling morphologies. Examples of Single-Crystal Particle morphologies with Self-Aligning Space-Filling morphologies include cubic particles, hexagonal platelets, hexagonal fibers, rectangular platelets, rectangular particles, octahedral particles, and the like.

Certain Self-Aligning Space-Filling morphologies provide reliable self-alignment in one direction, so that when the particles sit on a surface, at a minimum they align with at least one common crystallographic direction. For example, cubes can align along the <001>-direction yet be randomized with respect to the <010>- and <100>-directions. Platelets and fibers will align similarly. Cubes can also align perfectly with respect to all three crystallographic axes. Fibers cannot align in all three directions if they have a round cross-section, but can if their cross-section occupies a two dimensional Space-Filling geometry such as a square, rectangle or hexagon. Platelets can align in three dimensions if their morphology is uniform with respect to 3 dimensions. For instance, a hexagonal platelet can align in 3 dimensions, provided it has sufficient thickness to prevent platelets from overlapping. However, regardless of the thickness, a round platelet cannot align in 3 dimensions.

There are many applications where precise self-alignment is not important. For example, Self-Aligning morphologies may establish a preferred orientation that could be 10 degrees from the desired alignment direction, yet still sufficiently capture the desired properties of a single crystal. Thus, particles having such morphologies include particles that essentially have the desired morphology. For instance, for particles that are cubes, the particles need not be perfect cubes. The axes need not be at perfect 90 degree angles, nor exactly equal in length. Corners may also be cut off of the particles. Furthermore, "cube" or "cubic" is intended to refer to morphology, and is not intended to limit the particles to cubic crystal systems. Instead, Single-Crystal Particles that have orthorhombic, tetragonal or rhombohedral crystal structure may also be employed as cubes if they possess the defined cubic morphology. In other words, any essentially orthogonal Single-Crystal Particles in which the faces are essentially square, essentially rectangular, or both, that possess an essentially cubic morphology are considered cubes for purposes of the present invention.

The use of Self-Aligning Space-Filling single-crystal particles for monolithic structures can consist of a single layer of crystals. In addition, Single-Crystal-Like materials can also consist of multiple layers of crystals as well. The layer or layers can be conformal to curved surfaces, layers can be deposited on surfaces of complex geometry, and layers can be wound into complex geometries such as spirals, circles, and ellipes, so that the substrate surface need not be flat. It can also be curved, stepped or patterned. If the film is deposited on a solid but flexible surface such as a polymer film, it can be further shaped by folding or stretching the polymer film. In this way the particle film layer can be shaped and prepared for further processing, such as heat treating or sintering. Stacked layers of particles can be prepared by folding layers of polymer films.

Single-Crystal Particles suitable for use with the present invention are materials whose properties are strongly dependent on crystallographic direction, which are also known as Vector properties or more generally Tensor properties. Examples of Tensor properties include mechanical, electronic, electromechanical, optical and magnetic properties. For electromechanical single-crystal end-uses, including piezoelectric uses, exemplary compounds include lead zirconate titanate (PZT) compounds having the formula $Pb(Zr_xTi_{1-x})O_3$ with a perovskite structure wherein $0.20<x<0.80$, with x preferably being greater than about 0.52, and other materials with perovskite structure and properties that depend on crystallographic direction, such as lead zinc niobate doped with lead titanate, lead magnesium niobate doped with lead titanate, sodium potassium bismuth titanate doped with barium and zirconium, bismuth ferrite doped with lead titanate, and the like. PZT piezoelectric compounds are particularly preferred.

Optical Single-Crystal Particle compounds include doped alumina (sapphire), yttrium aluminum garnets (YAG), yttrium iron garnets (YIG), lead lanthanum zirconate titanate (PLZT), zinc oxide, rhodium doped barium titanate, gallium nitride, cadmium sulphide, titania, calcium fluoride, rare earth doped lanthanum chlorides, rare earth doped lanthanum fluorides, yttrium orthophosphate, terbium phosphate, and the like. Magnetic single crystal compounds include manganese zinc ferrite, strontium ferrite, barium ferrite, yttrium iron garnet, samarium cobalt alloys, neodymium-iron-boron alloys and the like.

In one embodiment of the present invention, the Single-Crystal Particles are grown to a larger size so that the entire microstructure consists of aligned Single-Crystal Particles. The Single-Crystal Particles are considered "seeds" if they are grown to a larger size via solid state or liquid phase sintering. In order to grow the seeds larger, there must always be a substantial size difference between the nutrient particles and the Single-Crystal Particles. The Single-Crystal Particles are much larger than the nanoparticles of the nutrient matrix, which are less than one micron in size and preferably less than 0.1 micron in size. This size difference enables the Single-Crystal Particles to grow at the expense of the nutrient particles. If the nutrient matrix nanoparticles and the Single-Crystal Particles were comparable in size, then growth of the Single-Crystal Particles would not consume the nutrient matrix and the fraction of aligned material would not be increased.

The Single-Crystal-Like polycrystalline materials of the present invention are prepared by packing and aligning a plurality of Single-Crystal Particles into an aligned array, and then bonding the particles together. Packing and aligning can be done in many ways. There are physical methods such as the use of screens and micromolds, which provide a mechanism to achieve one, two and three-dimensional alignment. These methods use a physical template, wherein Single-Crystal Particles can be passed through an opening of comparable dimension and having a controlled shape to precisely position and align the particles. The particles can be settled onto an adhesive-coated surface that secures the particles thereto upon contact of the dominant face of the Single-Crystal Particle with the adhesive.

A simpler approach settles the particles on a flat surface, thereby aligning the particles one-dimensionally perpendicular to the surface. In this case, the crystallographic alignment of the particles is randomized in the plane of the substrate and the alignment is one dimensional. For some systems such as piezocrystals, this is all that is necessary in order to get the required Single-Crystal-Like performance from the polycrystalline materials of the present invention. Three-dimensional alignment, however, maximizes the capture of Single-Crystal-Like properties.

Other packing and aligning methods include self-assembly methods. Electrostatic or magnetic forces may be used to align the Single-Crystal Particles. Another approach is to coat the seed crystals with wax in a manner such that each crystal is unagglomerated. The wax-coated single-crystal-particles can be mixed with water to make a suspension that can be poured onto a heated surface. When the water/wax-coated-Single-Crystal Particle suspension becomes hot, the wax layer become molten and serves to bond the dominant crystal faces of the particles together as they approach one another. Essentially any means by which alignment of the particles can be obtained is suitable for use with the present invention.

Microarrays may also be packed and aligned from suspensions of Single-Crystal Particles processed at volume fractions of about 0.01 to about 80% in a liquid. High volume fractions are preferred, i.e., about 50% or greater. The suspension is lightly agitated to increase packing density and to order the Single-Crystal Particles. The liquid is then decanted and the structure is dried. As drying proceeds, surface tensional forces, which arise during drying, further consolidate the Single-Crystal Particles using the dominant crystal faces to align their orientations with one another.

A particularly preferred approach uses two immiscible liquids and can be used to prepare monolayers of essentially any small particle. A particle dispersion is prepared at particle volume fractions of about 0.01 to about 80%. Light agitation is used with Single-Crystal Particles to increase packing density and to order the Particles. The dispersion is contacted with the surface of an immiscible supporting fluid, preferably by incremental addition.

The particle dispersion is prepared by dispersing the particles in a mixture of (1) a dispersant liquid that aids in the dispersion of the particles and as is it is removed provides a spreading tension that causes a film of the dispersion to spread on the surface of the supporting fluid and (2) a capillary liquid that acts on the particles to form the particle monolayer, drawing the particles together using the immiscible lower fluid as a lubricating surface. The lubricating action of the surface contributes to the alignment of the Single-Crystal Particles, permitting the particles to freely rearrange by rotation and translation.

Particle dispersions will contain between about a 1:99 and about a 99:1 volume ratio of dispersant liquid to capillary liquid. About a 50:50 ratio is typically preferred. In general, the amount of dispersant liquid must be sufficient to supply an adequate particle-spreading force before significant removal occurs, especially when the dispersant liquid is volatile and is removed by evaporation.

The supporting fluid is typically water. However, other high surface tension fluids on which particles can float without wetting, such as non-wetting metals with low melting points (e.g., gallium, mercury, and the like) can be used to support the particles, so that the particles can rearrange on the liquid metal surface. The surface tension must be sufficient to support the particles.

The solvents of the particle dispersion are selected so that a dispersion is provided with a density lower than that of the supporting fluid, which wets the particles, is immiscible with and does not react with the underlying supporting fluid layer, and draws the particles together. When the particles are Single-Crystal Particles, the dispersion interacts with the dominant crystal faces of the Single-Crystal Particles to form a consolidated, dense, aligned structure.

Thus, when the supporting fluid is water, the capillary liquid is selected from non-polar immiscible hydrocarbon solvents selected for being lighter than and immiscible with water to float the particles thereon. The hydrocarbon solvents may be selected from single alkanes and mixtures thereof capable of drawing the particles together by capillary action as the dispersant liquid is removed, examples of which include mineral oil, decalin, decane, hexane, and the like. According to one embodiment of the inventive method, the capillary liquid may be functionalized, for example, with moieties that polymerize upon exposure to UV light, or with other functional groups that interact with the particles. The capillary liquid may also contain nano-sized particles that a hierarchic structure with larger particles in the dispersion as the dispersant liquid evaporates.

The particle dispersion components must be selected so that the particles are incapable of being wetted by the supporting fluid. This may be an inherent property of the particle, or the particle may be coated to prevent wetting, such as with a hydrophobic surfactant when the supporting fluid is water. In the alternative, either the dispersant liquid, the capillary liquid, or both, may interact with the particle surface to prevent particle wetting by the supporting fluid.

When the supporting fluid is water, the dispersant liquid is a polar organic solvent such as ethanol, isopropanol, acetone, and the like. Without being bound by any particular theory, it is believed that molecules of the dispersant liquid attach themselves to the surface of the particles via their polar end, leaving the hydrocarbon non-polar end of the dispersant liquid molecules free to intermix with the non-polar capillary liquid, thereby preventing particle wetting and aiding in the dispersion of the particles in the particle dispersion. This is in addition to the dispersant liquid molecules providing the spreading tension that spreads a film of the dispersion across the surface of the supporting fluid as the dispersant liquid is removed.

For example, when the dispersant liquid is isopropanol, the particles are PZT and the capillary liquid is mineral oil, the alcohol group bonds to the PZT surface, thereby presenting the organic part of the isopropanol structure to the particle exterior and coating the particle with the non-polar portion of the molecule, thereby changing the nature of these surfaces from hydrophilic to hydrophobic. When a small amount of mineral oil is added to a mixture of PZT particles in isopropanol, the adsorbed isopropanol molecules preferentially interact with mineral oil molecules to trap a layer of mineral oil on the cube surfaces (i.e. the mineral oil wets the coated PZT particles), thereby increasing their hydrophobic character.

The mineral oil (being both lighter than water and immiscible in water) helps to float the PZT particles on the supporting fluid. As the particle dispersion touches the water/air interface, the spreading tension of the isopropanol causes it to spread across the water surface. The spreading tension provides a force that compresses the PZT particles against the container walls and against each other. As the particles come into close proximity with each other, the mineral oil (with its relatively high surface tension and good wetting of the alcohol-coated particles) provides a strong capillary force that stabilizes the microarray. The system energy is minimized when the PZT particles are oriented face-to-face and in contact with one another in the plane of the film. Thus, a microarray of densely packed particles forms, and floats like a raft on the water's surface. Domains within a PZT cube microarray are readily observed in FIG. 3, where PZT cubes are packed by the inventive process with their lateral faces in contact.

The above example shows how the inventive process can be performed with conventional fluids that can be readily found in any household. It is also possible to use alternative fluids, such as molten metals, glasses, polymers, monomers, and inorganic melts that crystallize or solidify upon cooling. Thus, it should be possible to draw thin layers of a variety of different materials. For instance, it is possible to fabricate particulate reinforced glass sheets where silicon carbide could be dispersed in a borosilicate glass to make a high strength tough glass. A metal matrix composite can be made with silicon-coated alumina dispersed in a matrix of aluminum to make a high strength metal matrix composite. A PZT powder can be dispersed in a matrix of poly(urethane) to make a transducer material. Copper powder could be dispersed in poly(ethylene) to make a conductive tape. It should be mentioned that the particulate phase in the material could be randomly oriented or oriented with a high degree of texture depending on the morphology of the particulate phase and whether or not each particle is a single crystal. Thus the method of the present invention is not necessarily limited to methods in which oriented or Single-Crystal Particle films are prepared. The particles need not be Single-Crystals, and even if Single-Crystals, the Particles need not be oriented. Instead, the inventive method can be used to make essentially any monolayer particle film dispersed in a matrix formed by removal of the dispersant liquid of the particle dispersion.

This method can also be used to make hierarchic structures. For example, spherical, micron-sized particles can be packed as a monolayer on film, and the capillary liquid can contain nanoparticles that are orders of magnitude smaller, that will pack in the intersticies of the larger particles as the dispersant liquid is removed. The net result is a film with dense hierarchic particle packing. The method of the present invention can be used to pack cubes very densely to achieve exceptional particle packing fractions of 80 volume percent and greater.

There are also many methods suitable for bonding together an array of Single-Crystal Particles. For example, the voids of a particle array can be filled with a nanoparticle suspension by casting the suspension on top of the array. Single-Crystal Particles can also be co-mixed with nanoparticles using a high volume fraction of Single-Crystal Particles and a smaller fraction of nanoparticles that act as a lubricating and binding phase that helps the Single-Crystal Particle ensemble organize while maintaining adhesion between the Single-Crystal Particles.

Single-Crystal Particles of the foregoing compounds are prepared by essentially conventional means, such as by precipitation from molten salt solvent or hydrothermal solutions, microwave-hydrothermal synthesis, vapor phase synthesis, aqueous precipitation, precipitation from homogeneous solution, sonochemistry, spray pyrolysis, biomemitic processing, emulsion processing, microemulsion processing, plasma synthesis, and the like. The particles are then aligned as described above, and bonded together, either by filling the voids therebetween with nanoparticles of the same or different material or polymer, and then heating the composite structure. The nanoparticles are prepared by physical grinding, by conventional sol-gel techniques or other techniques well known to those skilled in nanoscience.

Monolithic polycrystalline composite materials according to the present invention are prepared by heating the packed, aligned and filled Single-Crystal Particle array to a temperature at which solid state diffusion between the nanoparticles and the Single-Crystal Particles occurs, until the Single-Crystal Particles of the array are bonded together. To obtain a level of solid state diffusion sufficient to bind together adjacent particles, a temperature above about half of the melting temperature is required, which is most generally in the range 200 C to 2000 C. The temperature range selected will depend upon the material being bonded, but can be readily determined by those of ordinary skill in the art without undue experimentation within the defined range. For example, a temperature up to 2000 C is suitable for ceramic oxides. Temperatures as low as 200 C can be used to sinter and grow as grains materials such as fluorides. Temperatures even as low as 150 C may be used, but with high pressure (e.g., on the order of gigapascals) to sinter materials that densify at high temperatures.

To induce grain boundary mobility, a temperature higher than that employed for sintering is required. For example, the conditions used for processing polycrystalline ceramics may require a temperature between 1000 C and 1500 C. Conventional crystal growth methods typically will require much higher temperatures to melt oxides to single phase liquids. The present invention does not melt the material, but can, in some cases, form a liquid phase that coexists with the solid phase and thus, makes the material partially molten (liquid phase sintering). For example, lead oxide can be used to dissolve PZT and recrystallize it onto the seed Single-Crystal Particles. Other liquid phases can be envisioned, as long as their melting temperature is below that of the seed crystals and nutrient, and they can dissolve and recrystallize the nutrient and redeposit it onto the seed Single-Crystal Particles. In some cases, it is desirable to densify the entire structure so that there are no pores therein, and then let the Single-Crystal Particles grow through consumption of the nutrient by solid state processes (i.e., no liquid phase, but rather solid phase, sintering), or even by using a liquid phase. In other circumstances, the material may densify while the grains are growing, that is, the porosity disappears as the Single-Crystal Particles grow. It should be noted that the nutrient nanoparticles can differ compositionally from the seeds, e.g., the seeds can be strontium titanate cubes while the nutrient nanoparticles are PZT. Or, the seeds can be PZT and the nutrient nanoparticles can be lead magnesium niobate doped with lead titanate. These are just two examples of how the seeds and the nutrient nanoparticles can differ compositionally.

No matter how the polycrystalline material is formed, the preparation steps may be repeated to form a polycrystalline material having multiple layers of aligned cube-shaped particles. The resulting material is essentially a three-dimensional object with one, two, or three dimensional alignment of Single-Crystal Particles within.

The preparation of a polycrystalline array with one-dimensional alignment is shown in FIG. 1. Single-Crystal Particles 12 are aligned in one crystallographic direction, i.e., normal to the plane of surface 14. The crystallographic orientation of the particles in the other two-dimensions is completely randomized. For purposes of illustration, particles 12 are PZT Single-Crystal Particles, deposited on a flat substrate, which can be any type of polymer material such as Mylar™ or any type of metal such as platinum or any type of ceramic such as alumina. An adhesive (any kind) can be used to anchor the particles down, or even the surface tension of residual processing liquid, such as water, can accomplish this task. Voids 16 between the particles 12 are then filled with PZT nanoparticles 18. The nanoparticles can be prepared by the method disclosed by Das et al., "Low Temperature Preparation of Nano-crystalline Lead Zirconate Titanate Using Triethanolamine," (J. Am. Ceram. Soc.), 81(12), 3357-60 (1998). The assembly 20 is then heated t a temperature of 1200 C for 2 hours, resulting in growth of the Single-Crystal Particles 12 by consumption of the nanoparticles 18 until impingement of adjacent grain boundaries 22 occurs. This produces a polycrystalline material 24 consisting of piezoelectric Single-Crystal Particles aligned in one crystallographic direction but producing a net Single-Crystal-Like piezoelectric effect.

The preparation of a polycrystalline material 124 consisting of cubic Single-Crystal Particles 112 aligned in all three crystallographic directions is shown in FIG. 2. As in FIG. 1, the particles 112 are aligned in one crystallographic direction normal to the plane of surface 114. However, the particles, again PZT cubes, have been aligned three-dimensionally by being passed through a photomask such as those used in semiconductor manufacturing (not shown). The voids 116 between the Single-Crystal Particles 112 are again filled with PZT nanoparticles 118 and the assembly 120 is again heated at 1200 C for 2 hours to obtain growth of the Single-Crystal Particles by consumption of the nanoparticles until impingement of adjacent grain boundaries 122 occurs. However, because of the three-dimensional alignment, exceptionally low grain boundary angles are obtained between individual Single-Crystal Particles, significantly enhancing the net Single-Crystal-Like behavior in the polycrystalline material 124.

A polymer binder can be substituted for the nanoparticles 18 or 118 to obtain a polymer-ceramic composite that exhibits a net Single-Crystal-Like effect due to the oriented Single Crystal Particles. Powder particles of polymer may be employed, which are then heated to melt or sinter the polymer powder to form a binder bonding together the Single-Crystal Particles. Or a solvent solution of polymer may be used to fill the void between the Single-Crystal Particles, which is then heated to evaporate the solvent and form a polymer binder bonding together the individual Single-Crystal Particles. For example, a composite structure may be prepared by infiltrating microarrays with a 3% acetone solution of a polymer such as poly(methylmethacrylate), epoxy resin (Envirotex Lite from Environmental Technology, Inc.), polyurethane (9130A prepolymer/9130B curative from Epoxical, Inc.), and the like. The Single-Crystal Particles may also be packed and aligned onto the surface of an adhesive-coated polymer film or embedded into the surface of molten melted polymer film.

When a polymer binder is employed, the net Single-Crystal-Like effect is obtained independent of the polymer properties. Essentially any thermoplastic or thermosetting polymer may be used as the polymer binder, as well as any polymer that is capable of being sintered to form a binder bonding the Single-Crystal Particles together. Because the net Single-Crystal-Like effect is independent of the polymer properties, the polymer is instead chosen for the end use property desired for the polycrystalline composite. Thus, the polymer can be chosen as a passive component (e.g., a structural polymer can provide strength to a composite comprised of electro-optical Single Crystal Particles for use as an optical switch) and as an active component (e.g., an electrostrictive polymer can be used for a a composite comprised of piezoelectric Single Crystal Particles for an actuator). For instance, a polymer capable of forming a flexible film, such as poly (urethane), poly(vinylidene fluoride), and the like, may be chosen as a matrix in which piezoelectric Single-Crystal Particles can be packed and aligned to form a transducer useful to make a speaker having a micron-dimensioned thickness capable of being rolled up and applied as a film. Polymers may also be chosen for end-use properties such as rigidity, impact-resistance, heat resistance, cold resistance, optical transparency, electrical resistivity, and the like.

It will thus be appreciated that the present invention can be extended to essentially any present and future end-use for a single crystal. Essentially any Single-Crystal Particle having utility in a mechanical, electronic, electromechanical, optical or magnetic end-use application can be employed in the present invention to produce a polycrystalline composite material of macroscopic dimensions having the same utility as a single crystal. In addition to the piezoelectric applications for speakers and microphones discussed above, piezoelectric materials are also widely used in transducers, in general, as well as in dynamic random access memories (DRAMs), decoupling capacitors, acoustic sensors, optical filters, actuators and modulators. Polycrystalline composite replacements for the single crystals used in laser and photon detectors can also be prepared. Optical shutters can be prepared using polycrystalline composites of PLZT, which turns opaque black upon the application of a voltage.

Doped semiconductors for microelectronics can be prepared using Single-Crystal Particles of silicon can be doped to be p- or n-type semiconductors. Photorefractive materials for optical switching and memory storage can be prepared using oriented Single-Crystal Particles of Rh-doped barium titanate. Optical lasers can be prepared using oriented Single-Crystal Particles of doped sapphire.

The following non-limiting example set forth herein below illustrates certain aspects of the invention. All parts and percentages are by weight unless otherwise noted and all temperatures are in degrees Celsius. The stoichiometric values for the Single-Crystal Particle materials are approximate.

EXAMPLE

Preparation of PZT Single-Crystal Particle Array

Materials. All water used was de-ionized water purified using a MILLIPORE system. Nitric acid and sodium hydroxide were of analytical grade and directly used as received. Sodium polyacrylate have a weight-average molecular weight of 5100 daltons was purchased from Fluka Co. and used as received. Cube-shaped PZT particles were synthesized using a PARR pressure reactor according to the procedure disclosed by Cho, et al. "Hydrothermal Synthesis of Acircular Lead Zirconate Titanate (PZT)," *J. Cryst. Growth*, 226 (2-3), 313-326 (2001).

The PZT particle size distribution was measured using a MICROTRAC 9200 Full Range Analyzer (Leeds & Northrup). Particle morphology was determined using Field Emission Scanning Electron Microscopy (FESEM, LEO Electron Microscopy, Inc.). The particle size analysis indicated that the PZT particles had a mean volume diameter of 4.45 microns, a mean number diameter of 3.32 microns and a standard deviation of 1.37. The calculated specific surface area of the PZT particles was 1.51 $m^2/g$. The PZT particles were dispersed into water and ultrasonicated for two minutes before being loaded into the particle size analyzer.

An electroacoustic analyzer (MATEC 8000, Matec Applied Sciences) was used to measure the Zeta potential of the PZT particles suspension, the pH of which was adjusted using 0.01 M $HNO_3$ and 0.01 M NaOH as titrants. After each addition of base or acid, fifteen minutes was allowed for the entire solution to equilibrate to a stable pH value. Several aqueous sodium polyacrylate solutions with different concentrations were prepared under vigorous stirring under room temperature. The polymer solutions, used soon after the polymer completely dissolved, were added to a suspension of 22 g PZT particles into 220 mL water for obtaining the function of the Zeta potential against polymer concentration. A suspension containing 22 g PZT powder and 27 g sodium polyacrylate powder dispersed in 220 mL water was vigorously stirred for four hours and then used for the Zeta potential measurement for obtaining the function of the Zeta potential again pH.

4 g of PZT powder and 4.92 g of sodium polyacrylate powder were added to 40 mL water and vigorously stirred for four hours. The suspension was divided into several portions and the pH of each portion was titrated using fresh ammonium hydroxide solution ($NH_3$, 28.5 w/w %, Fisher Scientific) and 0.01 M $HNO_3$. Suspensions of pH 3.6, 6.0, 8.4, 9.7 and 11.0, measured with a small pH-meter (Fisher Scientific, Model 505 MP), were transferred onto glass slides separately. The surfaces of each glass slide were first washed with alcohol and acetone and finally washed with water. The cleaned glass slides were carefully dried and checked with an optical microscope to ensure that there was not any dust contaminants on the surfaces. Samples were air dried under a hood and covered during the drying process to prevent dust contamination. Samples made from suspensions of polymer were also prepared for comparison to samples containing polymer.

Polymer suspension samples having a pH of nine and above formed one-dimensional particle arrays. The particles were well-arranged, forming a planar array of very smooth surfaces, with virtually no defects observed. The particle array was of homogenous thickness, about 6.5 microns thick. The high degree of alignment improves electromechanical performance, including piezoelectricity, among other properties.

It will thus be appreciated that the inventive method is useful for processing nanopowders and micron-size powders into ultra-thin monolayers, down to micro- and nanometer sizes. The only restriction on powder particle size arises from gravity. If the particles are too heavy they will not remain at the fluid interface but fall to the bottom of the container.

The ability to process small particle sizes is useful, for example, in the manufacture of multilayer capacitors where the process enables dielectric layers of unprecedented thinness. However, the applications can be numerous for many different materials where thin layers of particulate materials are required, where the particulates can be metallic, ceramic, or polymeric. Thus, in addition to a wide range of electronic applications, there are optical, magnetic, catalytic, structural, and many other application areas for materials made from the present invention.

The present application claims priority benefit of U.S. Provisional Application No. 60/380,353 and U.S. patent application Ser. No. 10/145,372. Both Applications were filed on May 13, 2002, and the disclosures of both Applications are incorporated herein by reference.

The foregoing example and description of the preferred embodiment should be taken as illustrating, rather than as limiting the present invention as defined by the claims. As will be readily appreciated, numerous variations and combinations of the features set forth above can be utilized without departing from the present invention as set forth in the claims. All such variations are intended to be included within the scope of the following claims.

What is claimed is:

1. A method of forming a monolayer of particles, comprising the steps of:
   (A) contacting a particle dispersion with the surface of an immiscible supporting fluid, wherein the particle dispersion has a lower density than the supporting fluid and is a dispersion of particles capable of floating without wetting on the supporting fluid in a mixture of (1) a dispersant liquid that aids in the dispersion of the particles in the dispersion and provides a spreading tension that causes a film of the fluid dispersion to spread on the surface of the supporting fluid, and (2) a capillary fluid that acts on the particles to form a monolayer particle film;
   (B) removing the dispersant liquid so that a particle monolayer assembles at the interface of the supporting liquid and the particle dispersion; and
   (C) depositing the assembled particles onto a substrate surface.

2. The method of claim 1, wherein said particles are Single-Crystal Particles that align in at least the <001> direction upon removal of the dispersant liquid.

3. The method of claim 1, wherein said dispersant liquid is removed by evaporation.

4. The method of claim 3, wherein said dispersant liquid is volatile.

5. The method of claim 1, wherein said contacting step comprises incrementally adding said particle dispersion to the surface of said supporting liquid.

6. The method of claim 1, further comprising the step of transferring the particle monolayer to the surface of a solid substrate.

7. The method of claim 1, wherein the particle size is less than about 100 microns.

8. The method of claim 7, wherein the particle size is less than about one micron.

9. The method of claim 2, wherein said Single-Crystal Particles are cube-shaped.

10. A particle monolayer prepared by the method of claim 1, wherein said particles are Single-Crystal Particles aligned in at least the <001> direction.

11. The method of claim 1, wherein said capillary liquid comprises a monomer that when polymerized forms a polymeric particle matrix.

12. The method of claim 1, wherein said dispersant liquid and said capillary liquid are present in a volume ratio between about 30:70 and about 70:30.

13. The method of claim 1, wherein said supporting fluid is water.

14. The method of claim 13, wherein said capillary liquid is selected from the group consisting of mineral oil, decalin, decane, dodecane and hexane.

15. The method of claim 13, wherein said dispersant liquid is a polar organic solvent.

16. The method of claim 15, wherein said polar organic solvent is selected from the group consisting of isopropanol, ethanol and acetone.

17. The method of claim 2, wherein said Single-Crystal Particles have a morphology selected from the group consisting of triangular-, square-, rectangular- and hexagonal-platelets; triangular-, square-, rectangular-, and hexagonal prisms; and triangular-, square-, rectangular-, hexagonal- and cylindrical fibers.

18. The method of claim 2, wherein said Single-Crystal Particles have a morphology selected from the group consisting of tetrahedral, cube, and octahedron.

19. The method of claim 2, wherein said Single-Crystal Particles are particles of a material with crystallographic-direction-dependent properties.

20. The method of claim 1, wherein said particles are non-crystalline.

* * * * *